UNITED STATES PATENT OFFICE.

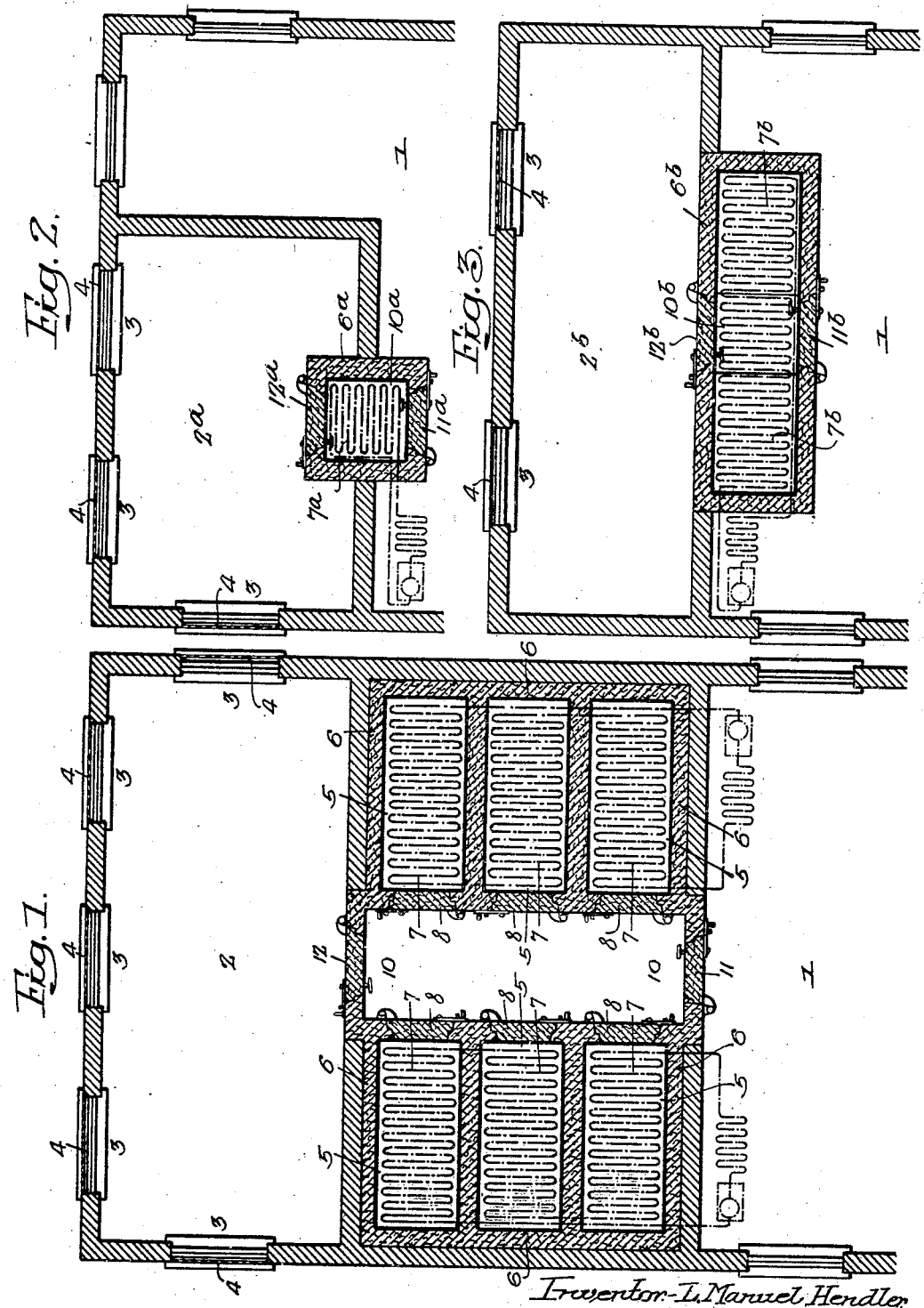

LIONEL MANUEL HENDLER, OF BALTIMORE, MARYLAND.

MEANS FOR EXCLUDING FLIES AND OTHER VERMIN FROM FOOD-CONTAINING ROOMS.

1,251,370.      Specification of Letters Patent.      Patented Dec. 25, 1917.

Application filed March 21, 1916. Serial No. 85,726.

*To all whom it may concern:*

Be it known that I, LIONEL MANUEL HENDLER, a citizen of the United States, and a resident of Baltimore, Maryland, have invented Improved Means for Excluding Flies and other Vermin from Food-Containing Rooms, of which the following is a specification.

The object of my invention is to provide means for excluding flies, and similar vermin, rodents and the like, from the rooms of manufacturing establishments where food products are being prepared or stored. More specifically my invention relates to means for excluding flies from the freezer room of ice-cream making establishments; the pasteurizing or other processing rooms, also rooms for storage of the various food ingredients such as sugar, syrup, fruits, &c. By "freezer room" I mean the room in which the operations of preparing and freezing or congealing the sweetened mixture of cream, fruit, &c., constituting ice cream or other frozen food products, are performed. As is well known, such material affords a most attractive spot for the collection of flies and other vermin, rodents, &c.

Cold air, or a condition of cold, is either fatal to the life of the fly or conducive to excluding the flies, vermin and rodents from such chilled areas, and my invention comprises the arrangement of a food preparing room, such as a freezer room, with a chilled entrance or vestibule as the only means of communication for ingress and egress, which vestibule is preferably an independent chamber or passage leading from the main portion of an establishment to the freezer room or other food preparing or storage room and through which the attendants and other persons engaged in the operation of manufacturing said food products must pass; the said freezer room on its exterior being otherwise thoroughly protected by screens from the ingress of flies.

These and other features of my invention are more fully described hereinafter, reference being had to the accompanying drawings, in which:

Figure 1, is a sectional plan view illustrating the application of my invention to an establishment in which food products are prepared, and Figs. 2 and 3, are similar plan views illustrating modified arrangements within the scope of my invention.

In Fig. 1, 1 may represent a portion of a warehouse, factory, or other building in which food products are manufactured, to wit: ice-cream; 2 the freezer room; that is to say, the room in which the materials are prepared by any suitable congealing process, which room, provided with the usual windows 3, has in such windows screens 4 of suitable type designed to completely exclude the entrance of flies and similar vermin; the room being further provided with means for excluding rodents and vermin which might find access through smaller channels. The temperature of this room may be anything desired or that atmospheric conditions may render necessary, being relatively warmer in summer than in winter, and at all times having a suitable working temperature. Reference is made to this point since while it is called the "freezer" room, it is in no sense a room designed to have a chilled or relatively low temperature.

Flanking the room I may arrange a series of so-called hardening chambers 5 which are in effect refrigerating chambers, the walls of which may be of suitable non-conducting material, as indicated at 6, and said chambers may be chilled by means of compressed ammonia or brine from a suitable source circulating through coils 7 which are usually disposed on the ceiling of said chambers, or by any other means. These chambers will be closed by ordinary refrigerating doors 8 of any usual type. Between said hardening chambers a vestibule or passageway 10 is provided, and under the usual conditions such passageway will have a very low temperature by reason of its relation to the chilled hardening chambers 5. Access to the vestibule from the main portion 1 of the establishment may be through an opening closed by a door 11 of the refrigerator type, and access to the freezer room 2 from said vestibule may be through an opening closed by a door 12 of similar type, and under usual conditions one of said doors will be shut at all times.

The resultant of this arrangement is the lowering of the temperature in the passage or vestibule 10 to such an extent that neither flies, vermin nor rodents will pass into the same from the main establishment 1; hence such arrangement, coupled with the complete screening of the freezer room from external access of flies and other vermin will render the room wholly free thereof, thereby making such room much more sanitary and hygienic.

In Fig. 2, a modified arrangement is disclosed in which the freezer room 2$^a$ may be set off in one corner or portion of the main establishment 1, or such room may be any room in which food is prepared. This room has intermediate the same and the main room a refrigerating passageway 10$^a$ as the means of communication therewith. In this structure, doors 11$^a$ and 12$^a$ of the same character as illustrated in Fig. 1, will be provided, and such passageway may be cooled by special coils 7$^a$ receiving a cooling medium from a suitable source, such as an ammonia condenser or brine cooler.

In other arrangements, I may provide the vestibule as a refrigerator proper; the structure serving the purpose of a chilled passageway and a refrigerator; the refrigerating chambers flanking the passageway on both sides and communicating directly therewith, as shown in Fig. 3; wherein coils 7$^b$ are shown for effecting the desired chilling of the air.

If desired, the passageway 10 indicated in Fig. 1, may be additionally cooled by coils disposed on the ceiling of the same for the reception of brine or ammonia from a suitable source.

It will be understood that my invention covers a chilled entrance room or vestibule which directly or indirectly communicates with a single room or any number of rooms; the only room communicating with the outside being the cold entrance room.

While reference is made to the use of my invention in establishments manufacturing ice-cream, it will be understood that it may be employed in any establishment, factory, hotel, restaurant or the like where food is being prepared and where the exclusion of flies is a desideratum.

I do not wish to be limited to any exact degree of temperature for the chilled passageway or vestibule, it being sufficient to effect such a chilling thereof as to repel flies and other vermin, rodents and the like.

I claim:

1. The combination with a building having a room within the same in open communication with the atmospheric air, of an inclosed and chilled passageway affording sole access to said room from the rest of the building.

2. The combination with a building having a plurality of rooms within the same in open communication with the atmospheric air, of an inclosed and chilled passageway affording the sole means of access between a pair of said rooms.

3. The combination with a building having a room within the same in open communication with the atmospheric air, of an inclosed passageway affording access to said room, and means for chilling such inclosed passageway.

4. The combination with a building, of a plurality of rooms within the same in open communication with the atmospheric air, an inclosed passageway between a pair of said rooms, and means for chilling such passageway.

5. The combination, in a building having a plurality of rooms, of a hardening chamber disposed between a pair of said rooms, chilling means for said hardening chamber, and a passageway affording the sole communication between said rooms, said passageway being chilled from the hardening room.

6. The combination, in a building having a plurality of rooms, of a plurality of hardening chambers disposed between a pair of said rooms, chilling means for said hardening chambers, and a passageway affording communication between said rooms, said passageway being chilled from the hardening rooms.

7. The combination, in a building having a plurality of rooms, one of which is employed for the manufacture of food products, of a hardening chamber disposed between a pair of said rooms, and a passageway adjacent said hardening chamber and affording the sole communication between said rooms, said passageway being chilled from the hardening room.

8. The combination, in a building having a plurality of rooms, one of which is employed for the manufacture of food products, of a plurality of sets of hardening chambers disposed between a pair of said rooms, and a passageway between said sets of hardening chambers and affording communication between said rooms, said passageway being chilled from the hardening rooms.

9. The combination with a building having a plurality of rooms, of a passageway forming the sole communication between a pair of said rooms, chambers communicating with said passageway, and means for chilling said chambers and passageway.

10. The combination with a building having a plurality of rooms, of a passageway forming the sole communication between a pair of said rooms, means for chilling said passageway, and refrigerating chambers communicating with said chilled passageway.

L. MANUEL HENDLER.